Feb. 12, 1924.
J. F. SKOLD
FLOW METER
Filed May 6, 1921
1,483,200
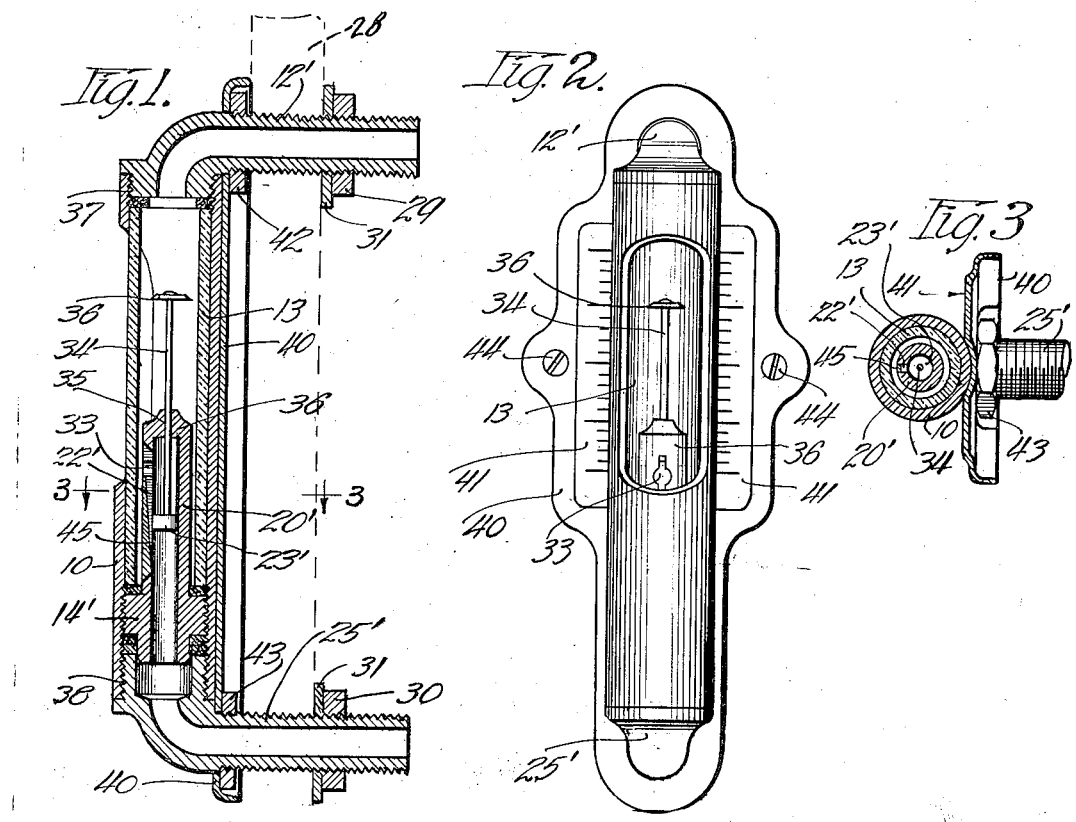
Inventor.
John F. Skold
Williams, Bradbury,
Sue & McCaleb
Attys.

Patented Feb. 12, 1924.

1,483,200

UNITED STATES PATENT OFFICE.

JOHN F. SKOLD, OF CHICAGO, ILLINOIS.

FLOW METER.

Application filed May 6, 1921. Serial No. 467,510.

*To all whom it may concern:*

Be it known that I, JOHN F. SKOLD, a citizen of the United States, and resident of Chicago, in the county of Cook and State of Illinois, have invented a certain new and useful Improvement in Flow Meters, of which the following is a full, clear, concise, and exact description, reference being had to the accompanying drawings, forming a part of this specification.

My invention relates to improvements in flow meters and is particularly concerned with, though not limited to, the provision of a novel type of flow meter for use on automobiles and other vehicles driven by internal combustion motors for indicating the rate of use of the fuel.

The objects of my invention are:

First, to provide a flow meter which is simple in construction and economical to manufacture;

Second, to provide a flow meter of the character described which will accurately indicate the rate of flow of very small quantities of fluid; and Third, to provide a flow meter the accuracy of which is but little affected when measuring small rates of flow by skin friction, eddy currents, and so forth.

Other objects will appear as this description progresses, reference being had to the accompanying drawings in which:

Figure 1 is a longitudinal section through one embodiment of my invention;

Figure 2 is a front elevation;

Figure 3 is a transverse section taken on line 3—3 of Figure 1.

Throughout the several views, similar characters will be used for referring to similar parts.

In the preferred embodiment of my invention, the hollow cylindrical plug 14' is provided with an inwardly extending extension 20' which has a groove 22' cut in its inner surface, which groove is preferably of constant width, but increases in depth toward the inner end of the tubular member where it communicates with a discharge opening 33 which passes through the wall of the tubular member. A disc 23' is reciprocably mounted in the tubular member 20' and carries an inwardly extending rod 34 which slides in a suitable opening 35 formed in the closed end 36 of the tubular member 20' and carries at its inner end an index 36.

To provide a scale for the index 36 I propose to use a plate 40 having a longitudinally extending raised portion 41 upon which a suitable scale can be engraved or otherwise inscribed. The end portions of this plate are provided with suitable openings through which the tubular extensions 12' and 25' may extend, and the plate is rigidly secured to the meter by means of the nuts 42 and 43 threaded upon the tubular extensions 12' and 25', respectively. Screws 44 may be used for securing the plate 40 to the dash board or any other suitable support.

I have discovered that the easiest way of providing the wedge-shaped grooves in the inner surface of the tubular member 20' is to first cut a longitudinally extending slot of the width desired for the slot entirely through the wall of the tubular member 20' and to then insert in the slot a suitably conformed wedge-shaped member 45.

Tubular extensions 12' and 25' are threaded into the opposite ends of the tubular supporting member 10. The free ends of the tubular extensions 12' and 25' are externally threaded and may be used for securing my improved meter to the dash 28 of an automobile, or any other suitable support, by providing suitable openings therein for these tubular extensions. Nuts 29 and 30 coacting with the outer screw-threaded ends of the tubular extensions 12' and 25', respectively, can be used for securing the meter to the support, suitable washers 31 being inserted between the support and the nuts 29 and 30.

In operation the fluid to be measured enters the meter through the tubular extension 25', flows upwardly through the tubular member 20' and lifts the disc 23' and passes around one edge of the disc through the groove 22' and out through the opening 33. The disc 23' will be raised until the passageway defined by it and the sides of the groove 22' is of sufficient area to accommodate the required flow of fluid under the pressure per unit area determined by the weight of the disc 23' and the parts supported by it. The scale can be calibrated by trial and the graduations of the scale may be made substantially equidistant by suitably varying the depth of the groove 22' throughout its extent.

By causing the fluid to be measured to pass through the groove 22', which is comparatively narrow in width, I have provided a meter the accuracy of which, when measuring small rates of flow, is affected in the least degree by skin friction and eddy currents, so that it is possible very accurately to measure small rates of flow.

While I have described the details of construction of the preferred embodiment of my invention, it is to be clearly understood that my invention is not limited to these details of construction, but is capable of other adaptations and modifications within the scope of the appended claims.

Having thus described my invention, what I claim is:

1. A flow meter comprising a tubular support having a sight opening formed therein, one end of said tubular support being internally threaded, a gauge glass in said tubular support, a hollow plug threaded into said internally threaded end for holding said gauge glass in said tubular support, the said plug having a tubular member projecting therefrom and into said gauge glass and provided at its inner end with a discharge opening, the said tubular member having a longitudinally extending groove formed in its inner surface and communicating with said discharge opening, the depth of said groove increasing toward the inner end of said tubular member, a disc mounted to reciprocate in said tubular member, a rod secured to said disc and extending through the inner end of said tubular member, and an index member carried by the inner end of said rod.

2. A flow meter comprising a tubular support having a sight opening formed therein, a gauge glass in said tubular support, a tubular member projecting from said tubular support and into said gauge glass and provided at its inner end with a discharge opening, the said tubular member having a longitudinally extending groove formed in its inner surface and communicating with said discharge opening, the depth of said groove increasing toward the inner end of said tubular member, a disc mounted to reciprocate in said tubular member, a rod secured to said disc and extending through the inner end of said tubular member, and an index member carried by the inner end of said rod.

3. A flow meter comprising a tubular support having a sight opening formed therein, a gauge glass in said tubular support, a tubular member projecting from said tubular support and into said gauge glass and provided at its inner end with a discharge opening, the said tubular member having a longitudinally extending groove formed in its inner surface and communicating with said discharge opening, the depth of said groove increasing toward the inner end of said tubular member, and a disc mounted to reciprocate in said tubular member.

In witness whereof, I hereunto subscribe my name this 30th day of April, 1921.

JOHN F. SKOLD.

Witnesses:
ALLAN C. AHLBERG,
EMIL J. BOURGEOIS.